US009567246B2

(12) United States Patent
Ko et al.

(10) Patent No.: US 9,567,246 B2
(45) Date of Patent: Feb. 14, 2017

(54) AIR DIFFUSION DEVICE

(71) Applicants: ANT21 CO., LTD, Daejeon (KR); Myung Han Ko, Daejeon (KR)

(72) Inventors: Myung Han Ko, Daejeon (KR); Nam Gyun Kim, Cheonan-si (KR); Seung Jin Lee, Jeollabuk-do (KR); Wook Bae, Daejeon (KR); Dae Hwan Yoon, Daejeon (KR); Joo Shin Park, Daejeon (KR); Kyung Han Ko, Daejeon (KR); Sang Woo Kim, Daejeon (KR); Jae Kyung Yang, Chungcheongnam-do (KR); Kyoung Ryeol Baek, Chungcheongnam-do (KR); Kyu Cheol Lee, Daejeon (KR); Byong Cheol Kwon, Daejeon (KR); Hyun Kim, Daejeon (KR); Jin Young Kwon, Daejeon (KR); Dong Woo Kim, Chungcheongbuk-do (KR)

(73) Assignees: ANT21 CO., LTD, Daejeon (KR); Myung Han Ko, Daejeon (KR)

( * ) Notice: Subject to any disclaimer, the term of this patent is extended or adjusted under 35 U.S.C. 154(b) by 290 days.

(21) Appl. No.: 14/353,219

(22) PCT Filed: Nov. 6, 2013

(86) PCT No.: PCT/KR2013/010010
§ 371 (c)(1),
(2) Date: Apr. 21, 2014

(87) PCT Pub. No.: WO2014/077542
PCT Pub. Date: May 22, 2014

(65) Prior Publication Data
US 2015/0246835 A1    Sep. 3, 2015

(30) Foreign Application Priority Data

Nov. 19, 2012 (KR) .......................... 10-2012-0130852
Nov. 19, 2012 (KR) .......................... 10-2012-0130853

(51) Int. Cl.
*B01F 3/04* (2006.01)
*C02F 3/20* (2006.01)

(52) U.S. Cl.
CPC .......... *C02F 3/201* (2013.01); *B01F 3/04262* (2013.01); *B01F 3/04269* (2013.01);
(Continued)

(58) Field of Classification Search
CPC .............. B01F 3/04262; B01F 3/04269; B01F 2003/04276; B01F 2003/04297; B01F 2003/04432; B01F 2003/04865; B01F 2003/04943; B01F 2215/0052; C02F 3/201; C02F 2203/006; Y02W 10/15
(Continued)

(56) References Cited

U.S. PATENT DOCUMENTS 3,490,752 A * 1/1970 Danjes ................ B01F 3/04241
  210/220
4,288,394 A * 9/1981 Ewing ................ B01F 3/04262
  137/852
(Continued)

FOREIGN PATENT DOCUMENTS

KR    20-0250119 Y    11/2001
KR    20-0368391 Y1   11/2004
(Continued)

*Primary Examiner* — Charles Bushey
*Assistant Examiner* — Scott Bushey
(74) *Attorney, Agent, or Firm* — Rabin & Berdo, P.C.

(57) ABSTRACT

An air diffusion device is provided. The device includes a base coupled to an air supply pipe for supply of air. The base has an air discharge hole for discharge of air supplied from the air supply pipe. The device further includes a perforated cover in the form of a multi-layered stepped plate the height of which is reduced stepwise from the center to the edge. The perforated cover has a plurality of through-holes for discharge of air, and it is coupled to an upper surface of the base to cover the air discharge hole, thus defining an air
(Continued)

guide chamber between the perforated cover and the base. The device further includes a securing mechanism configured to secure the perforated cover to the base.

18 Claims, 10 Drawing Sheets

(52) U.S. Cl.
CPC ........... *B01F 2003/04276* (2013.01); *B01F 2003/04297* (2013.01); *B01F 2003/04432* (2013.01); *B01F 2003/04865* (2013.01); *B01F 2003/04943* (2013.01); *B01F 2215/0052* (2013.01); *C02F 2203/006* (2013.01); *Y02W 10/15* (2015.05)

(58) Field of Classification Search
USPC .................................. 261/122.1, 122.2, 124
See application file for complete search history.

(56) References Cited

U.S. PATENT DOCUMENTS

| | | | | |
|---|---|---|---|---|
| 4,569,805 A * | 2/1986 | Hume | ................ | B01F 3/04262 261/122.1 |
| 4,581,137 A * | 4/1986 | Edwards | ............. | B01F 3/04269 210/220 |
| 4,842,779 A * | 6/1989 | Jager | ................... | B01F 3/04269 210/220 |
| 5,330,688 A | 7/1994 | Downs | | |
| 5,762,835 A * | 6/1998 | Bassfeld | ............. | B01F 3/04269 261/122.1 |
| 6,145,817 A * | 11/2000 | Jager | ................... | B01F 3/04269 210/220 |
| 6,244,574 B1 * | 6/2001 | Downs | ................. | B01F 3/0412 261/122.1 |
| 6,464,211 B1 * | 10/2002 | Downs | ............... | B01F 3/04241 261/122.1 |
| 8,833,743 B2 * | 9/2014 | Ko | ..................... | B01F 3/04262 261/121.1 |
| 2005/0151281 A1 * | 7/2005 | Tharp | ................. | B01F 3/04269 261/122.1 |
| 2011/0304063 A1 | 12/2011 | Ko | | |

FOREIGN PATENT DOCUMENTS

| | | |
|---|---|---|
| KR | 20-0400502 Y1 | 11/2005 |
| KR | 10-1010579 B1 | 1/2011 |
| KR | 10-1128977 B1 | 3/2012 |
| KR | 10-1198378 B1 | 11/2012 |
| KR | 10-1198379 B1 | 11/2012 |

* cited by examiner

AIR DIFFUSION DEVICE

BACKGROUND OF THE INVENTION

Field of the Invention

The present invention relates to an air diffusion device for efficiently supplying air and other gases in a process that requires dissolved oxygen, and more particularly, to an improved air diffusion device capable of ensuring easy assembly and enhanced aeration efficiency.

Description of the Related Art

Due to continuous industrialization and urbanization, environmental contamination is worsening and kinds of wastewater, dirty water, and sewage are also diversified. Facilities for treatment thereof are being advanced and treatment cost is increasing.

Currently, biological treatment methods, which are selectively combined with physical and chemical methods, are mainly used for wastewater treatment. These biological treatment methods may basically be classified into two kinds, i.e. an aerotropic treatment method and an anaerobic treatment method.

Anaerobic treatment advantageously does not require the supply of oxygen and achieves the acquisition of combustible methane gas as an energy source, but has disadvantages, such as long reaction duration, generation of bad odor, and the like. Most wastewater treatment facilities employ aerotropic treatment owing to advantages, such as short reaction duration, perfect removal of organic materials, and the like, although aerotropic treatment disadvantageously requires energy consumption for the supply of oxygen, for example.

In aerotropic treatment, the supply of oxygen is essential to the growth and activity of aerotropic microorganisms. To this end, an air diffusion device is used. The air diffusion device is installed in an aeration tank (reactor), and serves to maintain an appropriate amount of Dissolved Oxygen (DO) in the aeration tank. Gas is dispersed in wastewater in the aeration tank, and therefore a bubble size, bubble hold-up, contact between gas and liquid, and flow characteristics of gas and liquid have a great effect on operational conditions, performance, efficiency, and the like of the aeration tank.

An efficient method for increasing a contact area between gas and liquid in an aeration tank and increasing a mass transfer coefficient between gas and liquid is to increase bubble hold-up. To this end, uniform generation of bubbles having a reduced size is essential. During rising, bubbles are increased in size while coalesced in the aeration tank. This is because a bubble rising velocity increases in proportion to a bubble size, and therefore increase in the size of bubbles reduces a bubble hold-up period. In a case in which bubbles have a large size and generation of bubbles is not uniform, the bubbles will have a short hold-up period in the aeration tank, which causes deterioration of Standard Oxygen Transfer Efficiency (SOTE).

Various shapes of air diffusion devices, such as a pipe-shaped air diffusion device, a ball-shaped air diffusion device, a disc-shaped air diffusion device, and the like, have been developed and used. In addition, a multistage disc-shaped air diffusion device, in which a plurality of discs is arranged in multiple stages to increase the supply amount of air, has been supposed.

SUMMARY OF THE INVENTION

Various kinds of air diffusion devices are disclosed in Korean Registered Patent Publications No. 1198379 (22 Aug. 2012), No. 1198378 (20 Aug. 2012), No. 1010579 (25 Jun. 2010), and No. 1128977 (22 Jun. 2011), and Korean Registered Utility Model Publication No. 0368391 (11 Nov. 2004), and the like. At present, various shapes of air diffusion devices have been developed and applied to a variety of water treatment facilities, and various research to enhance aeration efficiency and to reduce manufacturing cost have been conducted.

Therefore, the present invention has been made in view of the above description, and it is an object of the present invention to provide an air diffusion device having an improved configuration to ensure easy assembly and enhanced aeration efficiency based on uniform aeration.

In accordance with one aspect of the present invention, to accomplish the above and other objects, an air diffusion device includes a base coupled to an air supply pipe for supply of air, the base having an air discharge hole for discharge of air supplied from the air supply pipe, a perforated cover in the form of a single-layered flat plate, the perforated cover having a plurality of through-holes for discharge of air, the perforated cover being coupled to an upper surface of the base to cover the air discharge hole, thus defining an air guide chamber between the perforated cover and the base, and a securing mechanism configured to secure the perforated cover to the base.

In accordance with another aspect of the present invention, an air diffusion device includes a base coupled to an air supply pipe for supply of air, the base having an air discharge hole for discharge of air supplied from the air supply pipe, a perforated cover in the form of a multi-layered stepped plate, the height of which is reduced stepwise from the center to the edge, the perforated cover having a plurality of through-holes for discharge of air, the perforated cover being coupled to an upper surface of the base to cover the air discharge hole, thus defining an air guide chamber between the perforated cover and the base, and a securing mechanism configured to secure the perforated cover to the base.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
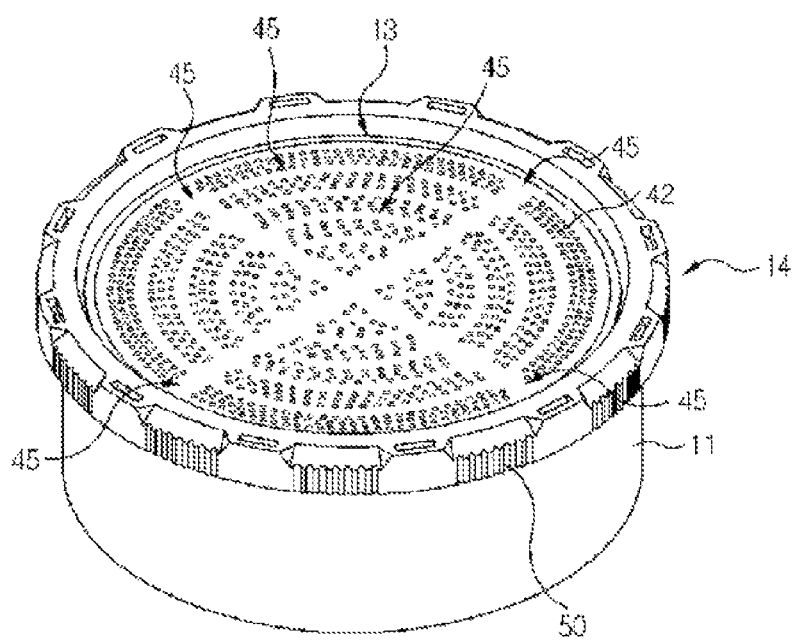
FIG. 1 is a perspective view showing an air diffusion device according to a first embodiment of the present invention.
Figure 2:
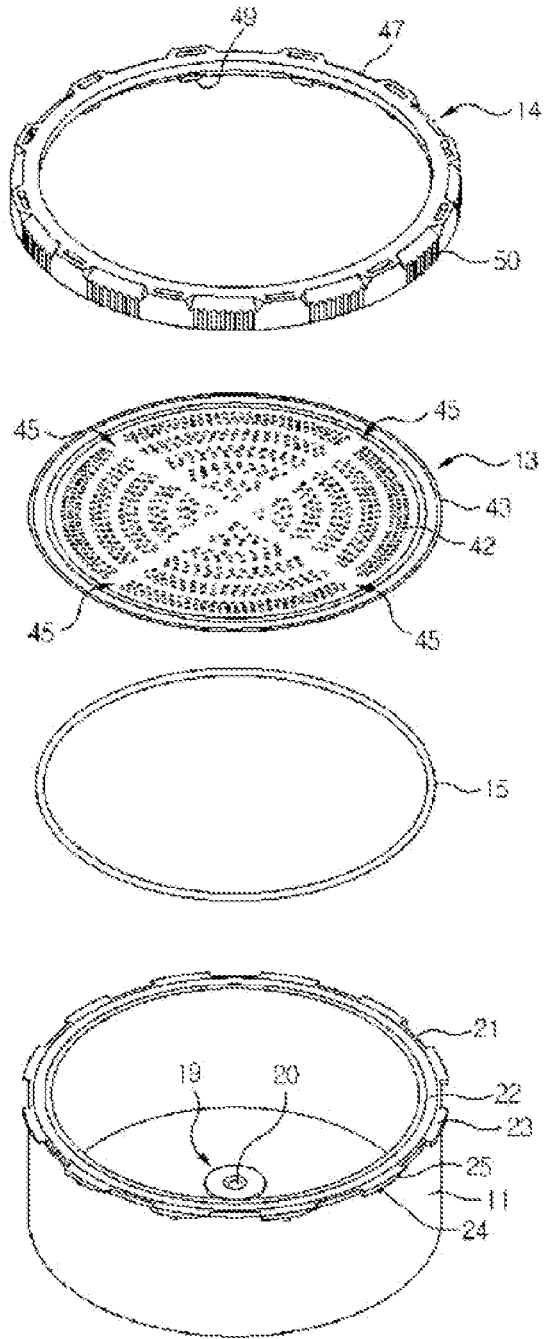
FIG. 2 is an exploded perspective view of the air diffusion device according to the first embodiment of the present invention when viewed from the top.
Figure 3:
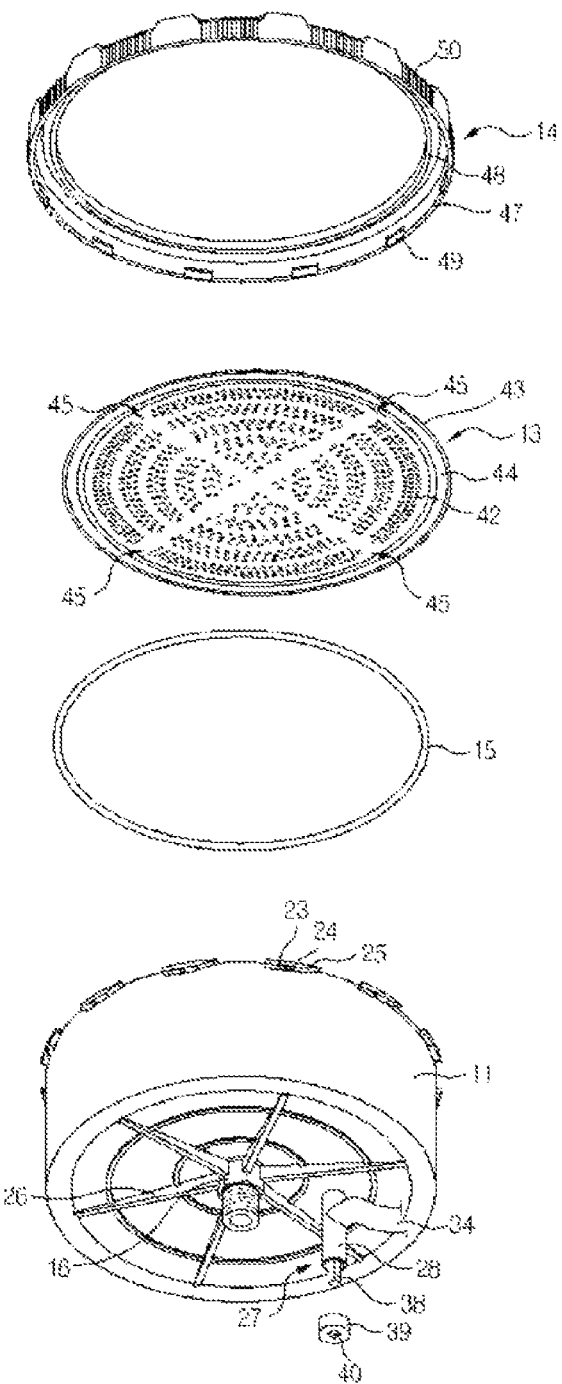
FIG. 3 is an exploded perspective view of the air diffusion device according to the first embodiment of the present invention when viewed from the bottom.

Hereinafter, an air diffusion device according to the present invention will be described in detail with reference to the accompanying drawings.

In the following description of the present invention, the size, shape or the like of constituent elements illustrated in the drawings may be exaggerated or schematically illustrated for clarity and convenience of explanation. Also, the terms particularly defined taking into consideration the configurations and operations of the present invention may be changed based on intentions of users or operators and customs. These terms should be construed as meanings and concepts conforming to the technical sprit of the present invention based on the general context of this specification.

As exemplarily shown in FIGS. 1 to 4, the air diffusion device, designated by reference numeral 10, according to a first embodiment of the present invention includes a base 11 coupled to an air supply pipe 5 that is used to supply air, a perforated cover 13 coupled to the top of the base 11 to define an air guide chamber 12 between the base 11 and the perforated cover 13, and a securing mechanism 14 configured to secure the perforated cover 13 to the base 11. A sealing member 15 is interposed between the base 11 and the perforated cover 13 to seal a gap therebetween.

A pipe connector 16, to which the air supply pipe 5 is coupled, is formed at a lower surface of the base 11. The pipe connector 16 may be provided with male screw threads to allow the pipe connector 16 to be fastened to the air supply pipe 5 via screwing. Naturally, a coupling configuration between the air supply pipe 5 and the pipe connector 16 may be altered into other configurations except for the screwing configuration. The pipe connector 16 may have an inner flow path. When air, supplied from the air supply pipe 5, passes through the inner flow path of the pipe connector 16, the air may be introduced into the air guide chamber 12 through an air supply port 17 formed in the bottom of the base 11.

A check valve 18 is installed in the pipe connector 16. The check valve 18 permits passage of air moving from the air supply pipe 5 to the air supply port 17 and interrupts movement of air, water, impurities, or the like from the air supply port 17 to the air supply pipe 5.

An air guide mechanism 19 is fitted into the air supply port 17 and serves to guide air to the top of the air guide chamber 12. The air guide mechanism 19 takes the form of a tubular structure internally defining a flow path for movement of air. The air guide mechanism 19 is provided at an upper end thereof with an air discharge hole 20 from which air moved through the flow path is discharged into the air guide chamber 12. Although the air guide mechanism 19 is illustrated in the drawing as being fastened to the base 11 via screwing, a coupling configuration of the air guide mechanism 19 may be altered into other configurations except for the screwing configuration.

The base 11 includes a cover bonding portion 21 provided at an upper edge thereof, the cover bonding portion 21 coming into close contact with the perforated cover 13. A receiving groove 22 for reception of the sealing member 15 is indented in the cover bonding portion 21. In addition, the base 11 further includes a plurality of securing projections 23, which protrude outward from the outer periphery of the base 11. The securing projections 23 serve to couple the base 11 to the securing mechanism 14. A coupling bump 24 protrudes downward from a lower surface of each securing projection 23. The securing projection 23 is further provided at one end thereof with a slope 25 that is downwardly inclined from a distal end to the center of the securing projection 23.

Figure 5:
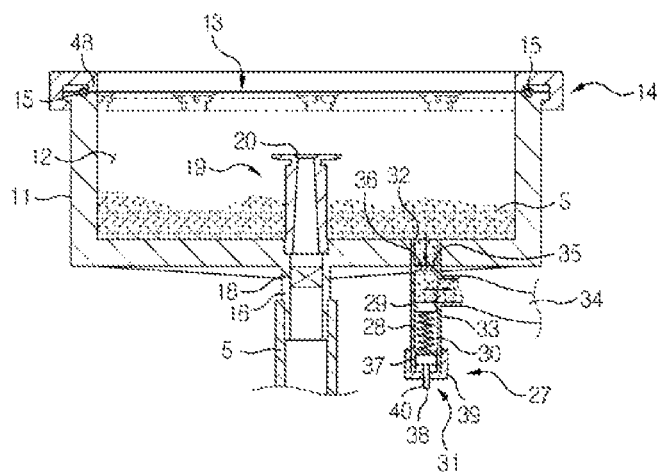
FIG. 5 is a view showing the discharge of impurities from the air diffusion device according to the first embodiment of the present invention.

A plurality of reinforcement ribs 26 and an impurity removal mechanism 27 are formed at the lower surface of the base 11. The impurity removal mechanism 27 serves to discharge impurities (designated by reference character S in FIG. 5) introduced into the air guide chamber 12 to the outside of the air guide chamber 12. Impurities S contained in water may be introduced into the air guide chamber 12 through a plurality of through-holes 42 of the perforated cover 13, the through-holes 42 serving to disperse air introduced into the air guide chamber 12 into the water. Removal of the impurities S is desirable because the impurities S accumulated in the air guide chamber 12 cause deterioration in the air supply efficiency of the air diffusion device 10. The impurity removal mechanism 27 discharges the impurities S accumulated in the air guide chamber 12, thereby preventing deterioration in the air supply efficiency of the air diffusion device 10.

The impurity removal mechanism 27 includes an impurity guide pipe 28 coupled to the base 11, an opening/closing member 29 movably installed in the impurity guide pipe 28, a spring 30 adapted to apply elastic force to the opening/closing member 29, and a spring support structure 31 movably inserted into the impurity guide pipe 28 to adjust the elastic force of the spring 30. The impurity guide pipe 28 has an impurity inlet 32 connected to the air guide chamber 12 to allow the impurities S accumulated in the air guide chamber 12 to be introduced into the impurity guide pipe 28, and an impurity outlet 33 connected to an impurity discharge pipe 34 that is used to guide the impurities S to the outside. The impurity inlet 32 is formed at one end of the impurity guide pipe 28 and the impurity outlet 33 is formed at a lateral side of the impurity guide pipe 28. When the impurities S are introduced through the impurity inlet 32, the impurities S move through an inner flow path of the impurity guide pipe 28 and are discharged outward through the impurity outlet 33 and the impurity discharge pipe 34.

A seat 35 having an orifice 36 is interposed between the impurity inlet 32 and the impurity outlet 33 within the impurity guide pipe 28. The opening/closing member 29 is adapted to come into close contact with the seat 35 or to be spaced apart from the seat 35 while moving in the impurity guide pipe 28. The orifice 36 is closed and hermetically sealed when the opening/closing member 29 comes into close contact with the seat 35, and is open when the opening/closing member 29 is spaced apart from the seat 35. The spring 30 applies elastic force to the opening/closing member 29 in a given direction to assist the opening/closing member 29 in coming into close contact with the seat 35.

The spring support structure 31 includes a spring support member 37 configured to support the spring 30 in contact with the spring 30, and an adjustor knob 38 coupled to one end of the spring support member 37. The spring support structure 31 is movably located in a region of the impurity guide pipe 28 below the impurity outlet 33. The spring support member 37 has male screw threads corresponding to female screw threads formed at the impurity guide pipe 28, and is fastened to the impurity guide pipe 28 via screwing.

A distal end of the adjustor knob 38 protrudes outward of the impurity guide pipe 28 through an open lower end of the impurity guide pipe 28. The spring support member 37 may be vertically moved as a user rotates the spring support member 37 by operating the adjustor knob 38. The spring 30 comes into contact at one end thereof with the opening/closing member 29 and at the other end thereof with the spring support member 37. As such, the spring 30 is compressed to thereby exert increased elastic force when the spring support member 37 is raised, and is stretched to thereby exert reduced elastic force when the spring support member 37 is lowered. In this way, the user may adjust the elastic force of the spring 30 by operating the adjustor knob 38.

To prevent the spring support structure 31 from being separated from the impurity guide pipe 28 upon receiving the elastic force of the spring 30, a spring support structure fixing member 39 is coupled to the distal end of the impurity guide pipe 28. The spring support structure fixing member 39 has a knob coupling hole 40 for insertion of the adjustor knob 38. The spring support structure fixing member 39 is fitted to the distal end of the impurity guide pipe 28 in a state in which the adjustor knob 38 is inserted into the knob coupling hole 40, which may prevent rotation of the adjustor knob 38. In addition to being press-fitted into the distal end of the impurity guide pipe 28 as exemplarily shown, the spring support structure fixing member 39 may be altered into other configurations in which it is coupled to the impurity guide pipe 28 to prevent rotation of the spring support structure 31.

Figure 4:
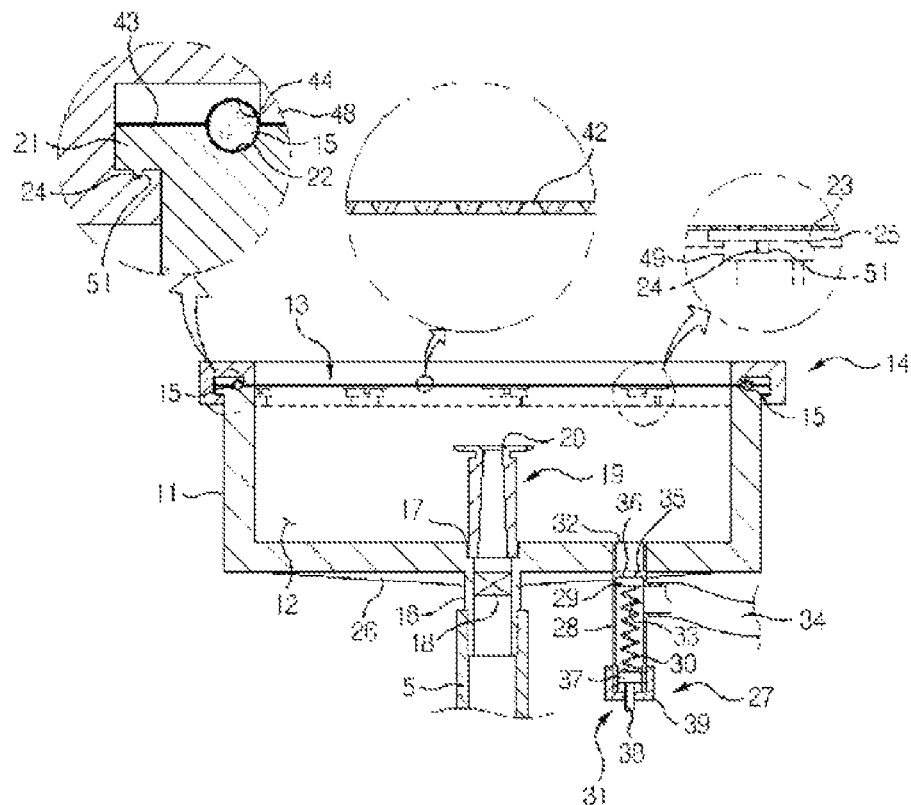
FIG. 4 is a sectional view showing the air diffusion device according to the first embodiment of the present invention.

As exemplarily shown in FIG. 4, when the internal pressure of the air guide chamber 12 is less than the elastic force of the spring 30, the opening/closing member 29 is moved to come into close contact with the seat 35 to close and hermetically seal the orifice 36, and thus air within the air guide chamber 12 is not discharged through the impurity removal mechanism 27. On the other hand, as exemplarily shown in FIG. 5, when the impurities S are introduced into the air guide chamber 12 and the internal pressure of the air guide chamber 12 becomes greater than the elastic force of the spring 30, the opening/closing member 29 compresses the spring 30 and is spaced apart from the seat 35 to open the orifice 36.

Then, when the opening/closing member 29, spaced apart from the seat 35, is moved to a position lower than the impurity outlet 33, the impurities S introduced through the impurity inlet 32 are discharged outward through the impurity outlet 33 by way of the orifice 36. Then, when the pressure of the air guide chamber 12 again becomes less than the elastic force of the spring 30 as the impurities S are discharged from the air guide chamber 12, the opening/closing member 29 is moved, by elastic force of the spring 30, to come into close contact with the seat 35, thereby closing the orifice 36.

Although the base 11 is illustrated as having a cylindrical shape in the drawing, the shape of the base 11 is not limited to the illustration and may be altered in various ways. In one example, assuming that the base 11 is gradually reduced in width and height from the edge to the center thereof, the impurities S introduced into the air guide chamber 12 may gather at the center of the base 11. Moreover, when the impurity removal mechanism 27 is installed at a relatively low position, i.e. near the center of the base 11, removal efficiency of the impurities S may be enhanced. In another example, the base 11 may be gradually reduced in height from the center to the edge thereof.

As exemplarily shown in FIGS. 1 to 4, the perforated cover 13 is coupled to an upper surface of the base 11 to cover a top opening of the base 11. The perforated cover 13 takes the form of a single layered flat plate, and has the through-holes 42 for air discharge. The perforated cover 13 includes a base bonding portion 43 provided at a lower edge thereof, the base bonding portion 43 coming into close contact with the cover bonding portion 21. A receiving groove 44 for reception of the sealing member 15 is indented in the base bonding portion 43.

The through-holes 42 may be arranged in the entire perforated cover 13 or may be arranged in a portion of the perforated cover 13, to discharge air, introduced into the air guide chamber 12, upward of the perforated cover 13. The perforated cover 13 has a non-perforated portion 45 having no through-hole 42. The non-perforated portion 45 may be a linear or circular portion extending from the center to the edge of the perforated cover 13. The through-holes 42 of the perforated cover 13 may reduce the rigidity of the perforated cover 13. Thus, the non-perforated portion 45 having no through-hole 42 has a greater rigidity than the portion of the perforated cover 13 having the through-holes 42. Thus, when providing the perforated cover 13 with a plurality of non-perforated portions 45, the non-perforated portions 45 serve as reinforcement portions to increase rigidity of the perforated cover 13, which may reduce damage to the perforated cover 13. Although the non-perforated portions 45 are illustrated as having a crisscross arrangement or concentric arrangement in the drawing, the shape or arrangement of the non-perforated portions 45 may be altered in various ways.

The through-holes 42 are gradually reduced in size from an inner surface to an outer surface of the perforated cover 13. Through provision of the tapered through-holes 42, it is possible to reduce the size of bubbles to be discharged outward through the through-holes 42. In addition, the through-holes 42 may be arranged in such a manner that a distance between the through-holes 42 increases from the edge to the center of the perforated cover 13. That is, a distance between the through-holes 42 in a peripheral region of the perforated cover 13 is relatively small, and a distance between the through-holes 42 in a central region of the perforated cover 13 is relatively large. This gradually increasing distance between the through-holes 42 from the edge to the center of the perforated cover 13 may cause bubbles discharged through the through-holes 42 to gather at the center of water, which may reduce generation of coarse bubbles.

The perforated cover 13 described above may be simply fabricated at low cost by molding a metal plate and perforating the through-holes 42. Naturally, the perforated cover 13 may be formed of various materials, such as composites, reinforced plastics, or the like, rather than the metal plate.

The perforated cover 13 is first put on the base 11 such that the base bonding portion 43 of the perforated cover 13 is bonded to the cover bonding portion 21 of the base 11, and thereafter is secured to the base 11 using the securing mechanism 14. The securing mechanism 14 includes a securing ring 47 coupled to an upper edge of the base 11 so as to cover the upper edge of the base 11 and the lower edge of the perforated cover 13, a cover pressure portion 48 protruding downward from the securing ring 47, and a plurality of pressure members 49 arranged at an inner periphery of the securing ring 47. A plurality of anti-slip portions 50 is arranged at an outer periphery of the securing ring 47. The anti-slip portions 50 serve to prevent slippage of the user's hand when the user couples the securing ring 47 to the base 11. The number of the pressure members 49 is equal to the number of the securing projections 23 formed at the base 11 and is arranged at the securing ring 47 at the same distance as that of the securing projections 23. A coupling recess 51 is indented in the center of an upper surface of each pressure member 49.

After the perforated cover 13 is placed on the upper surface of the base 11, the securing ring 47 is coupled to the upper edge of the base 11 so as to cover both the upper edge of the base 11 and the lower edge of the perforated cover 13. Then, when the securing ring 47 is turned by a given angle, the upper surface of each pressure member 49 slides on the slope 25 of the corresponding securing projection 23, thereby coming into close contact with the lower surface of the securing projection 23. In this case, the coupling bump 24 of the securing projection 23 is inserted into the coupling recess 51 of the pressure member 49, and the cover pressure portion 48 of the securing ring 47 pushes the lower edge of the perforated cover 13 to the upper edge of the base 11. As such, the securing projection 23 and the pressure member 49 are stably kept in a close contact state, and the perforated cover 13 is firmly secured to the base 11.

Figure 6:
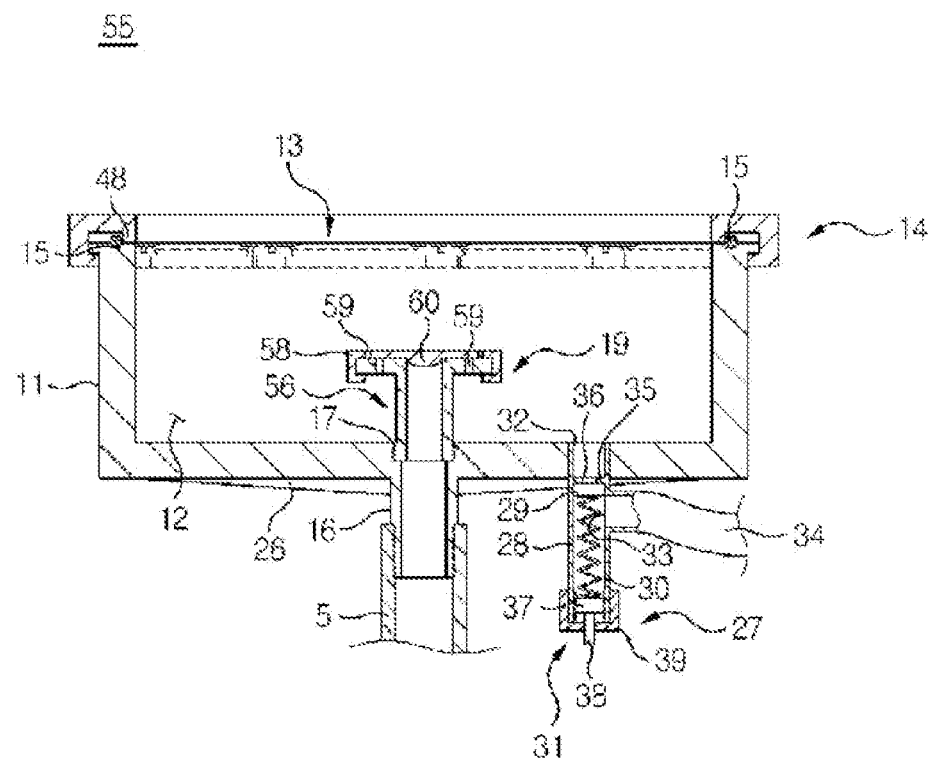
FIG. 6 is a sectional view showing an air diffusion device according to a second embodiment of the present invention.

FIG. 6 is a sectional view showing an air diffusion device according to a second embodiment of the present invention.

The air diffusion device, designated by reference numeral 55, as exemplarily shown in FIG. 6 has substantially the same configuration as the above described air diffusion device 10, except for an altered coupling configuration of the air guide mechanism 19 with respect to the air supply port 17 of the base 11. As exemplarily shown in FIGS. 6 and 7, the air guide mechanism 19 includes an air guide pipe 56 having a head 57 provided with the air discharge hole 20, from which air, supplied through the air supply port 17, is discharged into the air guide chamber 12, and a diaphragm cover 58 engaged with the head 57 and coming into close contact with an upper surface of the head 57 to cover the air discharge hole 20.

The head 57 is further provided around the air discharge hole 20 with a plurality of air guide holes 59. The air guide holes 59 serve to guide the air, discharged through the air discharge hole 20, into the air guide chamber 12. Additional air guide holes 59 to guide air into the air guide chamber 12 are also perforated in the diaphragm cover 58 so as not to overlap the air discharge hole 20 or the air guide holes 59 of the head 57. A plug 60 is formed at a lower surface of the diagram cover 58 to protrude to the air discharge hole 20. Thus, the plug 60 is inserted into the air discharge hole 20 to close the air discharge hole 20. The diaphragm cover 58 is formed of an elastically deformable material, such as rubber, silicon, or the like.

As exemplarily shown in FIG. 6, while air is not supplied through the air supply pipe 5, the diaphragm cover 58 comes into close contact with the head 57 of the air guide pipe 56 to close the air discharge hole 20, thereby preventing air, water, impurities, or the like within the air guide chamber 12 from moving backward to the air supply pipe 5 through the air discharge hole 20. Conversely, as exemplarily shown in FIG. 8, when air is supplied through the air supply pipe 5, the diaphragm cover 58 is elastically deformed by pressure of the air such that a central portion thereof is lifted and spaced apart from the head 57. In this case, the air, discharged through the air discharge hole 20 of the air guide pipe 56, moves along a gap between the head 57 and the diaphragm cover 58 and is discharged into the air guide chamber 12 through the air guide holes 59 of the head 57 and the air guide holes 59 of the diaphragm cover 58. Then, when the supply of air through the air supply pipe 5 stops, the diaphragm cover 58 is elastically restored to an original state thereof and comes into close contact with the head 57 to close the air discharge hole 20, thereby preventing air, water, or impurities from moving backward through the air discharge hole 20.

In this way, through provision of the air guide mechanism 19 having the diaphragm cover 58, the air diffusion device 55 according to the second embodiment of the present invention may prevent air, water, impurities, and the like from moving backward to the air supply pipe 5 while supplying air into the air guide chamber 12, without installation of a check valve.

Figure 9:
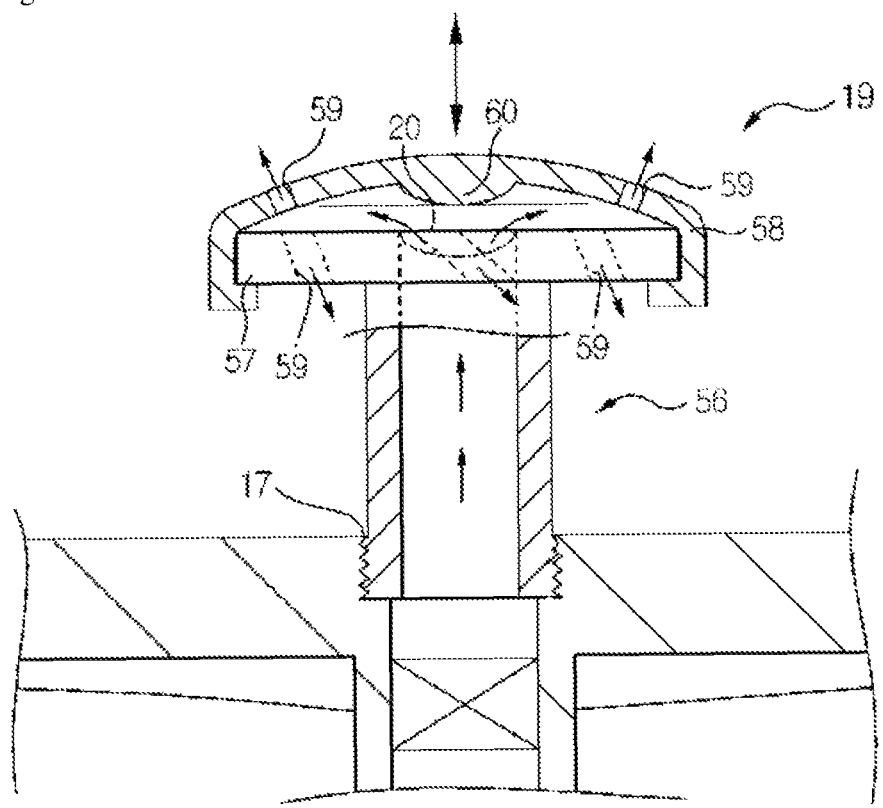
FIG. 9 is a view showing an alternative embodiment of the air guide mechanism.

FIG. 9 illustrates another alternative embodiment of the air guide mechanism.

Figure 7:
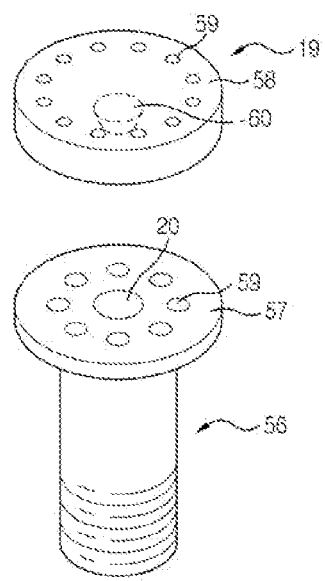
FIG. 7 is an exploded perspective view showing an air guide mechanism included in the air diffusion device according to the second embodiment of the present invention.
Figure 8:
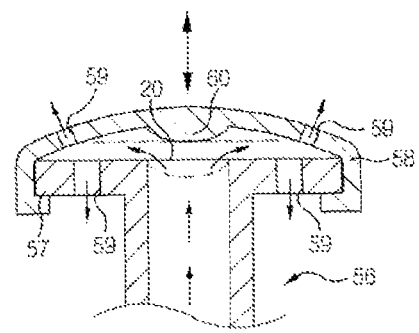
FIG. 8 is a sectional view showing the discharge of air through the air guide mechanism shown in FIG. 7.

The air guide mechanism 19, exemplarily shown in FIG. 9, has substantially the same configuration as the above described air guide mechanism 19 as exemplarily shown in FIGS. 6 to 8, except for an orientation of the air guide holes 59 perforated in the head 57 of the air guide pipe 56. The air guide holes 59 of the head 57 are tilted in a direction opposite to a direction in which the air guide pipe 56 is turned for screwing insertion into the air supply port 17. Thus, as air is discharged through the air guide holes 59 of the head 57 in a direction opposite to a direction in which the air guide pipe 56 is turned for screwing insertion into the air supply port 17, the air applies force to the air guide pipe 56 in a tightening direction thereof. In turn, as the air discharged through the air guide holes 59 of the head 57 applies force to the air guide pipe 56 in a tightening direction thereof, it is possible to prevent the air guide pipe 56 from being unintentionally released from the air supply port 17 due to force caused by air discharge.

Figure 10:
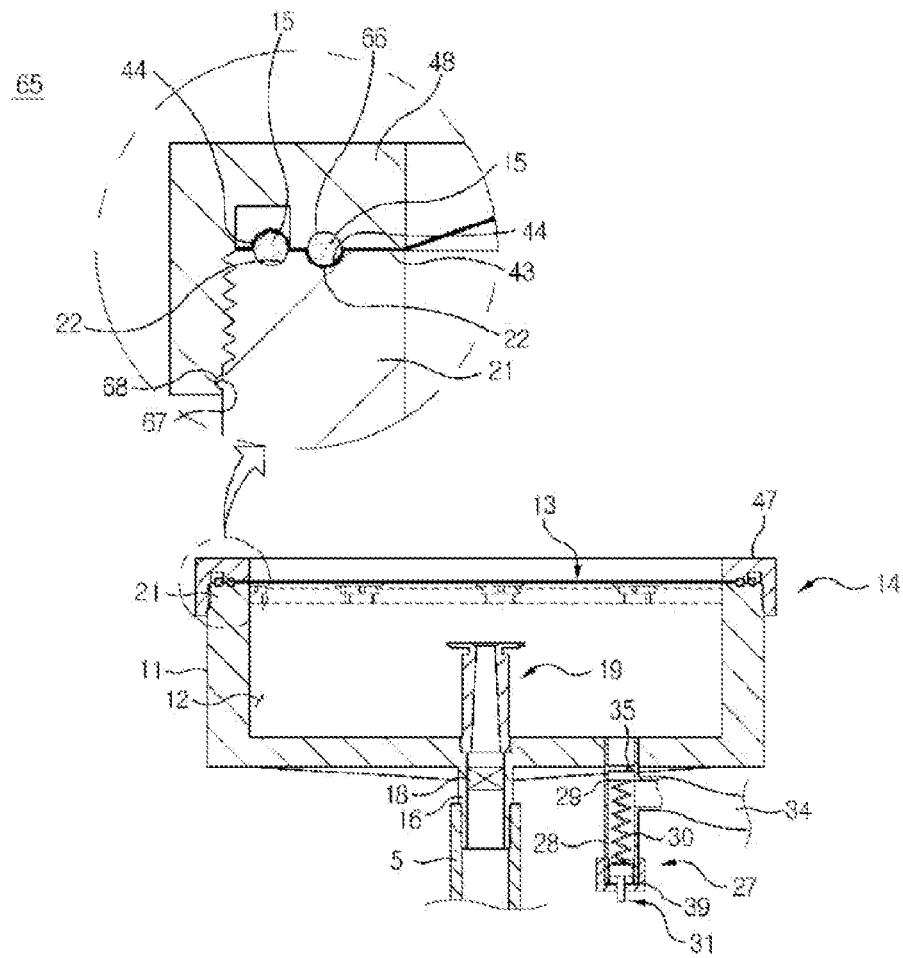
FIG. 10 is a sectional view showing an air diffusion device according to a third embodiment of the present invention.

FIG. 10 is a sectional view showing an air diffusion device according to a third embodiment of the present invention.

The air diffusion device, designated by reference numeral 65, exemplarily shown in FIG. 10 has substantially the same configuration as that of the air diffusion device 10 according to the first embodiment, except for some alterations in terms of a coupling relationship between the base 11 and the perforated cover 13, a coupling relationship between the base 11 and the securing mechanism 14, and the like. In addition to the sealing member 15 between the base 11 and the perforated cover 13, an additional sealing member 15 is interposed between the perforated cover 13 and the securing mechanism 14.

Two receiving grooves 22 are indented in the cover bonding portion 21 of the base 11, two receiving grooves 44 are indented in the base bonding portion 43 of the perforated cover 13, and a receiving groove 66 is indented in the cover pressure portion 48 of the securing mechanism 14. One of the two receiving grooves 44 indented in the perforated cover 13 is open to the receiving groove 22 of the base 11 and the other receiving groove 44 is open to the receiving groove 66 of the cover pressure portion 44. As the sealing member 15 is interposed between one receiving groove 44 of the perforated cover 13 and the receiving groove 22 of the base 11 facing each other, sealing between the base 11 and the perforated cover 13 is accomplished. In addition, as the sealing member 15 is interposed between the other receiving groove 44 of the perforated cover 13 and the receiving groove 66 of the cover pressure portion 48, sealing between the perforated cover 13 and the securing mechanism 14 is accomplished.

Male screw threads are formed at the outer periphery of the top of the base 11, and female screw threads corresponding to the male screw threads are formed at the inner periphery of the securing ring 47, such that the securing ring 47 is fastened to the base 11 via screwing. In addition, an outwardly protruding ridge 67 is formed at a position of the outer periphery of the base 11 where the male screw threads end, and a valley 68 corresponding to the ridge 67 is formed at a position of an inner surface of the securing ring 47. The ridge 67 is press-fitted into the valley 68 as the securing ring 47 is completely screwed to the base 11, which prevents the securing ring 47 from being released from the base 11. A release prevention configuration for preventing unintentional release of the securing ring 47 screwed to the base 11 is not limited thereto, and various other alterations are possible.

Figure 11:
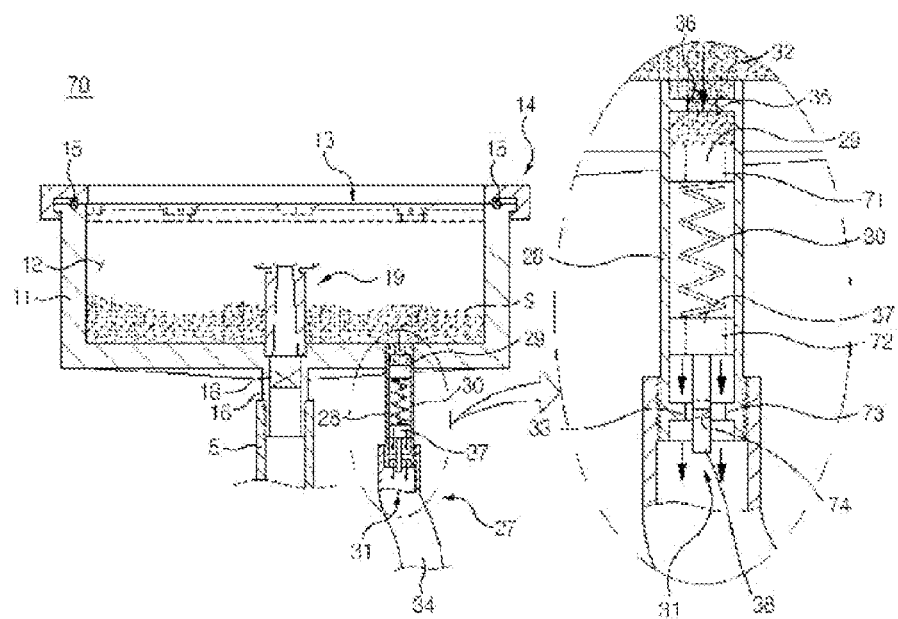
FIG. 11 is a sectional view showing an air diffusion device according to a fourth embodiment of the present invention.

FIG. 11 is a sectional view showing an air diffusion device according to a fourth embodiment of the present invention.

The air diffusion device, designated by reference numeral 70, according to the fourth embodiment of the present invention has substantially the same configuration as that of the air diffusion device 10 according to the first embodiment, except for the impurity removal mechanism 27 having an altered configuration as compared to that in the air diffusion device 10 of the first embodiment.

The impurity removal mechanism 27 of the air diffusion device 70 according to the fourth embodiment includes the impurity guide pipe 28 coupled to the base 11, the opening/closing member 29 movably installed in the impurity guide pipe 28, the spring 30 adapted to apply elastic force to the opening/closing member 29, and the spring support structure 31 movably inserted into the impurity guide pipe 28 to adjust the elastic force of the spring 30. The impurity guide pipe 28 has the impurity inlet 32 connected to the air guide chamber 12 to allow the impurities S accumulated in the air guide chamber 12 to be introduced into the impurity guide pipe 28, and the impurity outlet 33 configured to discharge the impurities S to the outside. The impurity inlet 32 is formed at one end of the impurity guide pipe 28, and the impurity outlet 33 is formed in a spring support structure coupling portion 73. The spring support structure coupling portion 73 is formed inside the impurity guide pipe 28 at the other end thereof for coupling of the spring support structure 31. The impurity discharge pipe 34 is connected to the other end of the impurity guide pipe 28 to guide the impurities S, discharged from the impurity outlet 33, to the outside.

The seat 35 having the orifice 36 is located in the impurity guide pipe 28 near one end of the impurity guide pipe 28. The opening/closing member 29 is adapted to come into close contact with the seat 35 or to be spaced apart from the seat 35 while moving in the impurity guide pipe 28. The orifice 36 is closed and hermetically sealed when the opening/closing member 29 comes into close contact with the seat 35, and is open when the opening/closing member 29 is spaced apart from the seat 35. The spring 30 applies elastic force to the opening/closing member 29 in a given direction to assist the opening/closing member 29 in coming into close contact with the seat 35. The opening/closing member 29 has a passage 71, through which the impurities S having passed through the orifice 36 are moved to the impurity outlet 33.

The spring support structure 31 includes the spring support member 37 configured to support the spring 30 in contact with the spring 30, and the adjustor knob 38 coupled to one end of the spring support member 37. The spring support member 37 has a passage 72, through which the impurities S having passed through the passage 71 of the opening/closing member 29 are moved to the impurity outlet 33. The adjustor knob 38 is provided with male screw threads, and is screwed through a knob fastening hole 74 formed in the center of the spring support structure coupling portion 73.

The distal end of the adjustor knob 38 protrudes outward of the impurity guide pipe 28 through the open lower end of the impurity guide pipe 28. The spring support member 37 may be vertically moved as the user rotates the spring support member 37 by operating the adjustor knob 38. The spring 30 comes into contact at one end thereof with the opening/closing member 29 and at the other end thereof with the spring support member 37. As such, the spring 30 is compressed to thereby exert increased elastic force when the spring support member 37 is raised, and is stretched to thereby exert reduced elastic force when the spring support member 37 is lowered. In this way, the user may adjust the elastic force of the spring 30 by operating the adjustor knob 38. Naturally, adjustment in the elastic force of the spring 30 using the adjustor knob 38 may be possible only before the impurity guide pipe 28 is connected to the impurity discharge pipe 34.

When the pressure of the air guide chamber 12 is less than the elastic force of the spring 30, the opening/closing member 29 is moved to come into close contact with the seat 35 to close and hermetically seal the orifice 36, and thus air within the air guide chamber 12 is not discharged through the impurity removal mechanism 27. On the other hand, when the impurities S are introduced into the air guide chamber 12 and the internal pressure of the air guide chamber 12 becomes greater than the elastic force of the spring 30, as exemplarily shown, the opening/closing member 29 compresses the spring 30 and is spaced apart from the seat 35 to open the orifice 36.

Then, when the orifice 36 is open, the impurities S, introduced through the impurity inlet 32 from the air guide chamber 12, sequentially pass through the orifice 36 and the passage 71 of the opening/closing member 29 and are moved to the spring support member 37. Then, the impurities S, moved to the spring support member 37, sequentially pass through the passage 72 of the spring support member 37 and the impurity outlet 33 of the spring support structure coupling portion 73, and are discharged to the outside through the impurity discharge pipe 34. When the pressure of the air guide chamber 12 again becomes less than the elastic force of the spring 30 as the impurities S are discharged from the air guide chamber 12, the opening/closing member 29 is moved, by elastic force of the spring 30, to come into close contact with the seat 35, thereby again closing the orifice 36.

Figure 12:
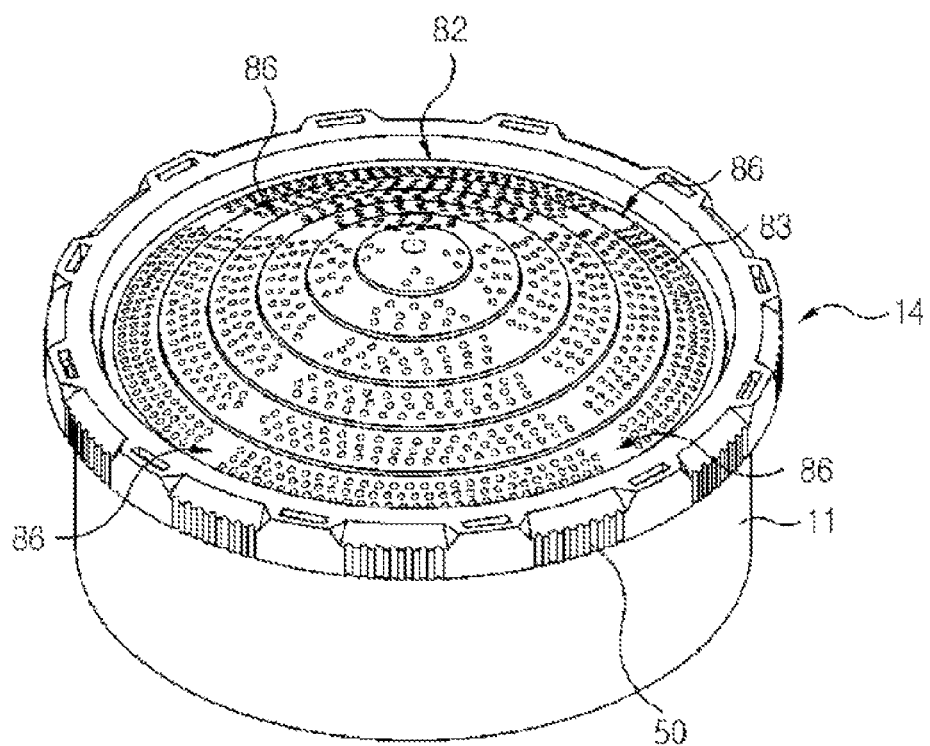
FIG. 12 is a perspective view showing an air diffusion device according to a fifth embodiment of the present invention.
Figure 13:
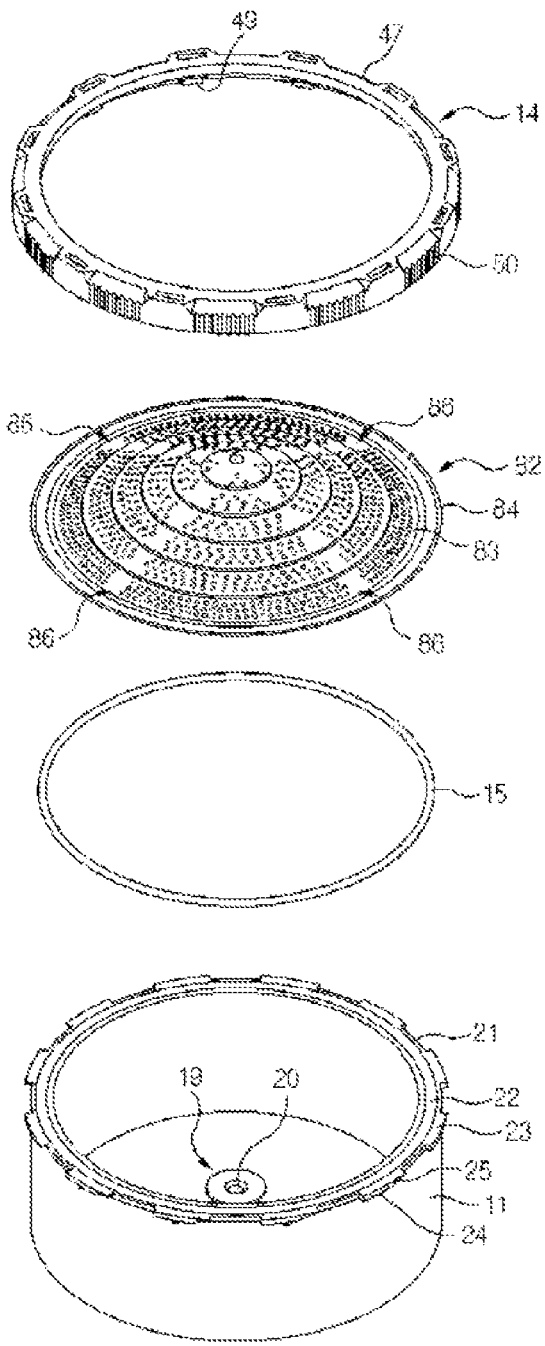
FIG. 13 is an exploded perspective view of the air diffusion device according to the fifth embodiment of the present invention when viewed from the top.
Figure 14:
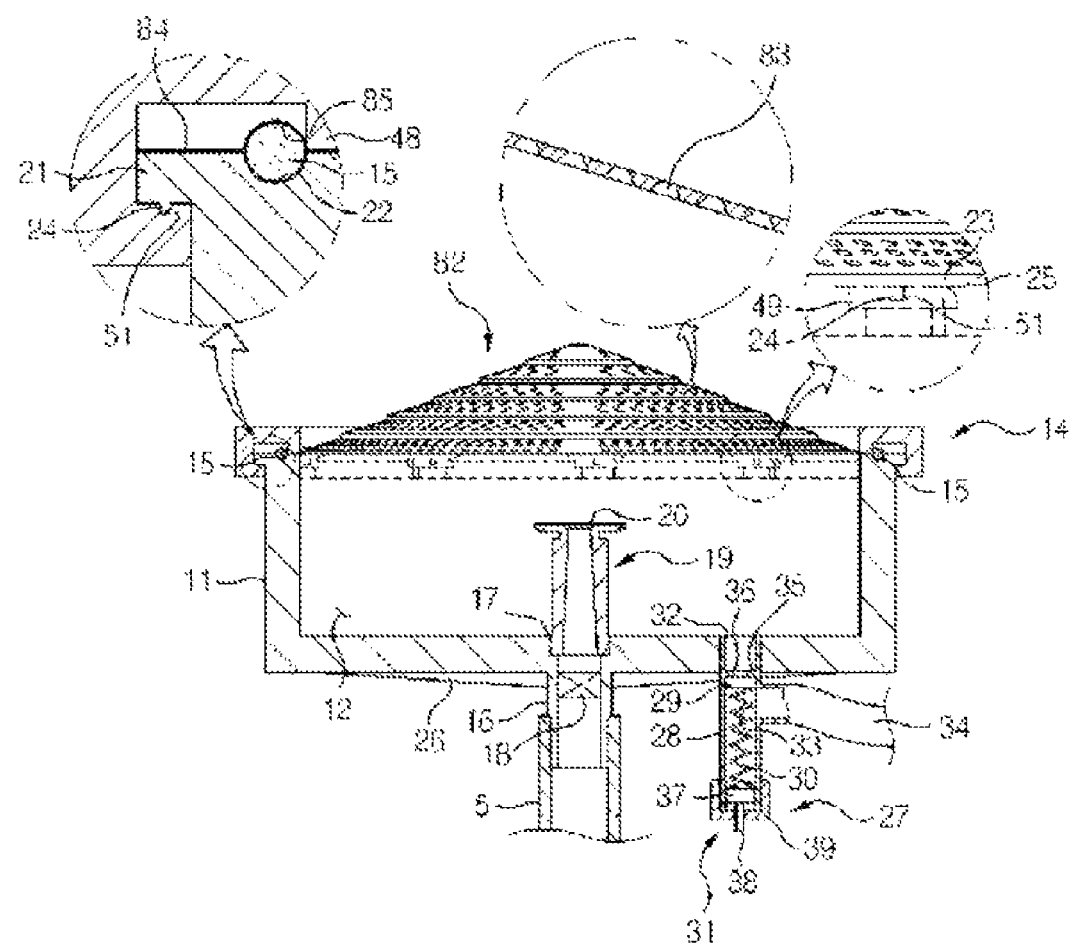
FIG. 14 is a sectional view showing the air diffusion device according to the fifth embodiment of the present invention.

FIGS. 12 to 14 show an air diffusion device according to a fifth embodiment of the present invention.

As exemplarily shown in FIGS. 12 to 14, the air diffusion device, designated by reference numeral 80, according to the fifth embodiment of the present invention includes the base 11 coupled to the air supply pipe 5 that is used to supply air, a perforated cover 82 coupled to the top of the base 11 to define the air guide chamber 12 between the base 11 and the perforated cover 82, and the securing mechanism 14 configured to secure the perforated cover 82 to the base 11. The sealing member 15 is interposed between the base 11 and the perforated cover 82 to seal a gap therebetween. Here, the base 11 and the securing mechanism 14 are equal to those in the embodiment exemplarily shown in FIGS. 1 to 5.

The perforated cover 82 of the air diffusion device 80 according to the fifth embodiment of the present invention is coupled to the upper surface of the base 11 to cover the top opening of the base 11. The perforated cover 82 has a multi-stepped single layer shape, the height of which is reduced stepwise from the center to the edge. The perforated cover 82 has a plurality of through-holes 83 for air discharge. The perforated cover 82 includes a base bonding portion 84 provided at a lower edge thereof, the base bonding portion 84 coming into close contact with the cover bonding portion 21. A receiving groove 85 for reception of the sealing member 15 is indented in the base bonding portion 84.

The through-holes 83 may be arranged in the entire perforated cover 82 or may be arranged in a portion of the perforated cover 82, to discharge air, introduced into the air guide chamber 12, upward of the perforated cover 82. The perforated cover 82 has a non-perforated portion 86 having no through-hole 83. The non-perforated portion 86 may be a linear or circular portion extending from the center to the edge of the perforated cover 82. The through-holes 83 of the perforated cover 82 may reduce the rigidity of the perforated cover 82. Thus, the non-perforated portion 86 having no through-hole 83 has a greater rigidity than the portion of the perforated cover 82 having the through-holes 83. Thus, when providing the perforated cover 82 with a plurality of non-perforated portions 86, the non-perforated portions 86 serve as reinforcement portions to increase rigidity of the perforated cover 82, which may reduce damage to the perforated cover 82. Although the non-perforated portions 86 are illustrated as having a crisscross arrangement in the drawing, the shape or arrangement of the non-perforated portions 86 may be altered in various ways.

The through-holes 83 are gradually reduced in size from an inner surface to an outer surface of the perforated cover 82. Through provision of the tapered through-holes 83, it is possible to reduce the size of bubbles to be discharged outward through the through-holes 83. In addition, the through-holes 83 may be arranged in such a manner that a distance between the through-holes 83 increases from the edge to the center of the perforated cover 82. That is, a distance between the through-holes 83 in a peripheral region of the perforated cover 82 is relatively small, and a distance between the through-holes 83 in a central region of the perforated cover 82 is relatively large. This increasing distance between the through-holes 83 from the edge to the center of the perforated cover 82 may cause bubbles discharged through the through-holes 83 to gather at the center of water, which may reduce generation of coarse bubbles.

The perforated cover 82 may be fabricated simply at low cost by bending a metal plate in a multi-layered form and perforating the through-holes 83 in the multi-layered metal plate. When perforating the through-holes 83 in the multi-layered metal plate, the through-holes 83 are preferably not perforated in bent portions. Since stress is concentrated at the bent portions upon application of external force, the through-holes 83 perforated in the bent portions may increase the risk of damage to the perforated cover 82. The perforated cover 82 may be formed of various materials, such as composites, reinforced plastics, or the like, rather than the metal plate.

After the perforated cover 82 is put on the base 11 such that the base bonding portion 84 of the perforated cover 82 is bonded to the cover bonding portion 21 of the base 11, the perforated cover 82 is secured to the base 11 using the securing mechanism 14. Securing of the perforated cover 82 using the securing mechanism 14 has been described above.

In the present invention, instead of the perforated cover 13 having a flat plate shape, the perforated cover 82 having the multi-layered stepped shape may be applied to the various embodiments exemplarily shown in FIGS. 6 to 11, to construct various air diffusion devices.

As described above, according to the present invention, as a result of assembling the perforated cover 13; 82 having the through-holes 42; 83 to the base 11 by means of the securing mechanism 14 that is separably coupled to the base 11, the air diffusion device has ease in assembly and disassembly thereof. In addition, the through-holes 42; 83 have an efficient arrangement in the perforated covers 13; 82, which ensures uniform aeration.

Further, in the air diffusion device according to the present invention, impurities S introduced into the air guide chamber 12 may be automatically discharged outward of the air guide chamber 12 through the impurity removal mechanism 27, which may reduce deterioration of aeration efficiency due to introduction of the impurities S. Moreover, easy management after installation is possible.

Furthermore, in the air diffusion device according to the present invention, through provision of the diaphragm cover 58 used to open or close the air discharge hole 20 from which air is discharged into the air guide chamber 12, the diaphragm cover 58, which is spaced apart from the air discharge hole 20 during supply of air, may be elastically deformed when the supply of air stops, thereby covering the air discharge hole 20. As such, it is possible to prevent wastewater, sludge, impurities, and the like from entering the air supply pipe 5.

In the present invention, a coupling relationship between the perforated cover 13; 82 and the base 11, a configuration of the securing mechanism 14 used to secure the perforated cover 13; 82 to the base 11, a coupling relationship between the securing mechanism 14 and the perforated cover 13; 82, and a coupling relationship between the securing mechanism 14 and the base 11 are not limited to illustrations, and may be altered in various ways. In addition, a configuration of the air guide mechanism 19 or the impurity removal mechanism 27 or a coupling relationship between the air guide mechanism 19 or the impurity removal mechanism 27 and the base 11 may be altered in various ways.

The embodiments of the present invention described above and illustrated in the drawings should not be construed as limiting the technical spirit of the present invention. The scope of the present invention should be defined as disclosed in the accompanying claims, and those skilled in the art will appreciate that various modifications, additions and substitutions are possible without departing from the scope and spirit of the invention

What is claimed is:
1. An air diffusion device comprising:
  a base coupled to an air supply pipe for supply of air, the base having an air discharge hole for discharge of air supplied from the air supply pipe;
  a perforated cover in the form of a multi-layered stepped plate, the height of which is reduced stepwise from the center to the edge, the perforated cover having a plurality of through-holes for discharge of air, the perforated cover being coupled to an upper surface of the base to cover the air discharge hole, thus defining an air guide chamber between the perforated cover and the base; and a securing mechanism configured to secure the perforated cover to the base, wherein the base is provided at an upper edge thereof with a cover bonding portion coming into close contact with the perforated cover, and the perforated cover is provided at a lower edge thereof with a base bonding portion coming into close contact with the cover bonding portion, and wherein the securing mechanism includes a securing ring coupled to the upper edge of the base to cover both the upper edge of the base and the lower edge of the perforated cover, and a cover pressure portion protruding downward from the securing ring to push the lower edge of the perforated cover to the upper edge of the base.

2. The device according to claim 1, further comprising an air guide mechanism fitted into an air supply port of the base and placed in the air guide chamber, wherein the air guide mechanism includes an air guide pipe having a head provided with the air discharge hole, from which air, supplied through the air supply port, is discharged into the air guide chamber, and a diaphragm cover engaged with the head and coming into close contact with an upper surface of the head to cover the air discharge hole, and wherein at least one of the head and the diaphragm cover has an air guide hole, through which air, discharged from the air discharge hole, is directed into the air guide chamber when the diaphragm cover is elastically deformed to thereby be spaced apart from the head upon receiving pressure of the air discharged from the air discharge hole.

3. The device according to claim 2, wherein a plug is formed at a lower surface of the diaphragm cover to protrude to the air discharge hole, the plug being inserted into the air discharge hole to close the air discharge hole when air is not supplied, thereby preventing backflow of fluid through the air discharge hole and consequently preventing wastewater and impurities from entering the air supply pipe.

4. The device according to claim 2, wherein the air guide pipe is fastened to the air supply port via screwing, and wherein the air guide hole is perforated in the head and is tilted in a direction opposite to a direction in which the air guide pipe is turned for screwing insertion into the air supply port, such that air is discharged through the air discharge hole in a direction opposite to the direction in which the air guide pipe is turned for screwing insertion into the air supply port, thereby applying force to the air guide pipe in a tightening direction thereof.

5. The device according to claim 1, further comprising an impurity removal mechanism coupled to the base to discharge impurities, introduced into the air guide chamber, to the outside of the air guide chamber, wherein the impurity removal mechanism includes:

an impurity guide pipe coupled to the base, the impurity guide pipe having an impurity inlet for introduction of impurities of the air guide chamber and an impurity outlet for outward discharge of the impurities;

a seat located in the impurity guide pipe at a position between the impurity inlet and the impurity outlet, the seat having an orifice connecting the impurity inlet and the impurity outlet to each other;

an opening/closing member movably installed between the seat and the impurity outlet to open or close the orifice; and a spring installed in the impurity guide tube to apply elastic force to the opening/closing member to allow the opening/closing member to come into close contact with the seat, wherein, when pressure of the air guide chamber increases due to introduction of impurities to thereby become greater than the elastic force of the spring, the opening/closing member pushes the spring and is spaced apart from the seat, thereby opening the orifice.

6. The device according to claim 5, wherein the impurity removal mechanism further includes a spring support structure movably inserted in the impurity guide pipe to support the spring by coming into contact with a distal end of the spring, and wherein the spring support structure is fastened to the impurity guide pipe via screwing, so as to be adjustable in position by a user.

7. The device according to claim 6, wherein the spring support structure includes a spring support member movably installed in the impurity guide pipe to come into contact with the distal end of the spring, and an adjustor knob coupled to the spring support member so as to protrude outward of the impurity guide pipe, and wherein the impurity removal mechanism further includes a spring support structure fixing member coupled to the impurity guide pipe to fix the adjustor knob.

8. The device according to claim 5, wherein the impurity outlet is provided at a lateral side of the impurity guide tube below the seat, such that the impurity inlet and the impurity outlet are connected to each other when the opening/closing member is moved to a position lower than the impurity outlet while compressing the spring.

9. The device according to claim 5, wherein the opening/closing member has a passage to allow impurities having passed through the orifice to move to the impurity outlet, and wherein the passage is closed and hermetically sealed by the seat when the opening/closing member comes into close contact with the seat, and is open when the opening/closing member is spaced apart from the seat to allow the impurities having passed through the orifice to move to the impurity outlet.

10. The device according to claim 5, wherein the base is reduced in width and height from the edge to the center thereof to gather introduced impurities at the center of the base, and the impurity removal mechanism is installed near the center of the base.

11. The device according to claim 1, wherein the through-holes are arranged at different distances increasing from the edge to the center of the perforated cover.

12. The device according to claim 1, wherein the through-holes are tapered with gradually reducing size from an inner surface to an outer surface of the perforated cover.

13. The device according to claim 1, wherein the perforated cover includes a non-perforated portion having no through-hole, and the non-perforated portion extends from the edge to the center of the perforated cover.

14. The device according to claim 1, wherein a plurality of securing projections protrudes outward from an outer periphery of the base, and a plurality of pressure members is provided at an inner periphery of the securing ring, the pressure members being pressed by the securing projections.

15. The device according to claim 1, wherein any one of each securing projections and each pressure member is provided with a coupling recess, and the other one is provided with a coupling bump configured to be inserted into the coupling recess.

16. The device according to claim 1, wherein the base is provided at an outer periphery thereof with male screw threads, and the securing ring is provided at an inner periphery thereof with female screw threads corresponding to the male screw threads of the base.

17. The device according to claim 1, further comprising a sealing member interposed between the cover bonding portion and the base bonding portion.

18. The device according to claim 1, further comprising a sealing member interposed between the perforated cover and the securing mechanism.

* * * * *